(12) United States Patent
Jung et al.

(10) Patent No.: US 10,993,131 B2
(45) Date of Patent: Apr. 27, 2021

(54) METHOD FOR PERFORMING LOGGING BY TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 15/762,617

(22) PCT Filed: Sep. 26, 2016

(86) PCT No.: PCT/KR2016/010767
§ 371 (c)(1),
(2) Date: Mar. 23, 2018

(87) PCT Pub. No.: WO2017/052332
PCT Pub. Date: Mar. 30, 2017

(65) Prior Publication Data
US 2018/0270688 A1 Sep. 20, 2018

Related U.S. Application Data

(60) Provisional application No. 62/232,367, filed on Sep. 24, 2015.

(51) Int. Cl.
*H04W 24/10* (2009.01)
*H04W 36/00* (2009.01)
(Continued)

(52) U.S. Cl.
CPC .......... *H04W 24/10* (2013.01); *H04B 17/345* (2015.01); *H04J 11/005* (2013.01); *H04W 36/0088* (2013.01)

(58) Field of Classification Search
CPC .... H04B 17/345; H04J 11/005; H04W 24/10; H04W 36/0088
See application file for complete search history.

(56) References Cited

U.S. PATENT DOCUMENTS

| 10,419,145 B2 * | 9/2019 | Wang .................... H04W 24/04 |
| 2013/0044621 A1 * | 2/2013 | Jung ................... H04W 72/082 370/252 |

(Continued)

FOREIGN PATENT DOCUMENTS

WO    2012/148204 A2    11/2012

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.5.0, (Mar. 2015), See session 23.4.2; table 23.4.2-1; and figure 23.4.2-1.

(Continued)

*Primary Examiner* — Khaled M Kassim
(74) *Attorney, Agent, or Firm* — Dentons US LLP

(57) ABSTRACT

The present invention provides a method for performing logging by a terminal in a wireless communication system, the method comprising: determining whether a downlink has been affected by interference; when it is determined that whether the downlink has been affected by interference is unclear, determining whether to perform logging of measurement for the downlink; and performing the logging according to the determination as to whether to perform the logging.

7 Claims, 21 Drawing Sheets

(51) Int. Cl.
 H04J 11/00 (2006.01)
 H04B 17/345 (2015.01)

(56) References Cited

U.S. PATENT DOCUMENTS

| | | | | | |
|---|---|---|---|---|---|
| 2013/0196650 | A1* | 8/2013 | Futaki | ............... | H04W 24/10 455/424 |
| 2013/0286873 | A1* | 10/2013 | Wilkinson | ........ | H04W 72/1231 370/252 |
| 2014/0029507 | A1* | 1/2014 | Dimou | ............... | H04B 7/15564 370/315 |
| 2014/0119334 | A1* | 5/2014 | Kazmi | ............... | H04W 24/10 370/330 |
| 2014/0153482 | A1* | 6/2014 | Schmidt | ............... | H04L 5/0055 370/328 |
| 2014/0177486 | A1* | 6/2014 | Wang | ............... | H04L 5/0053 370/280 |
| 2014/0241250 | A1* | 8/2014 | Jung | ............... | H04W 24/10 370/328 |
| 2015/0043515 | A1* | 2/2015 | Zhang | ............... | H04W 4/16 370/329 |
| 2015/0044972 | A1 | 2/2015 | Lee et al. | | |
| 2015/0049689 | A1* | 2/2015 | Seo | ............... | H04L 5/005 370/329 |
| 2016/0143042 | A1* | 5/2016 | Nagata | ............... | H04L 5/14 370/329 |
| 2016/0269949 | A1* | 9/2016 | Burstrom | ............... | H04W 24/02 |
| 2016/0286561 | A1* | 9/2016 | Huang | ............... | H04W 16/32 |
| 2018/0241493 | A1* | 8/2018 | Wang | ............... | H04W 24/08 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)", 3GPP TS 36.304 V8.5.0, (Mar. 2009).

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.5.0, (Mar. 2009).

Kyocera, "Logged MDT under IDC", R2-153389, 3GPP TSG-RAN WG2 #91, Beijing, China, Aug. 24-28, 2015, See sessions 2-3; and figure 23.4.2-1.

International Search Report from PCT/KR2016/010767, dated Dec. 28, 2016.

\* cited by examiner

METHOD FOR PERFORMING LOGGING BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2016/010767, filed on Sep. 26, 2016, which claims the benefit of U.S. Provisional Application No. 62/232,367 filed on Sep. 24, 2015, the contents of which are all hereby incorporated by reference herein in their entirety.

BACKGROUND OF THE INVENTION

Field of the Invention

The present invention relates to wireless communication, and more particularly, to a logging method performed by a user device in a wireless communication system and the user device performing the method.

Related Art

In the International Telecommunication Union Radio Communication sector (ITU-R), standardization of International Mobile Telecommunication (IMT)-Advanced, which is a next generation mobile communication system after 3rd generation, is underway. IMT-Advanced aims to support IP (Internet Protocol) based multimedia service at a data transfer rate of 1 Gbps in a stationary and low-speed moving state, and at a data transfer rate of 100 Mbps in a high-speed moving state.

The 3rd Generation Partnership Project (3GPP) is preparing, as a system standard meeting the requirements of IMT-Advanced, the LTE-Advanced (LTE-A), an improved version of LTE (Long Term Evolution), based on OFDMA (Orthogonal Frequency Division Multiple Access)/SC-FDMA (Single Carrier-Frequency Division Multiple Access) transmission scheme. LTE-A is one of the strong candidates for IMT-Advanced.

In order to allow the user to access the various networks anytime and anywhere, a single user device may be equipped with a global navigation satellite system (GNSS) receiver, including transceivers for wireless communication systems such as LTE, WiFi, Bluetooth, etc. That is, one user device may perform LTE downlink while simultaneously communicating using another communication system (for example, WiFi, Bluetooth, etc.). That is, while the user device is performing LTE downlink, communication may be performed based on another communication system included in the user device. Accordingly, the LTE downlink of the user device may be interfered by communication based on said another communication system.

The user device may also know via measurement that the LTE communication of the user device has been interfered by communication based on another communication system. If the user device finds that the LTE communication of the user device has been interfered by communication based on another communication system, the user device may transmit an interference indicator to the network.

However, the user device is not always able to generate the interference indicator and transmit the indicator to the network. Thus, it is necessary for the user device to vary the operation of logging the measurement (or measurement result), depending on whether the user device has capabilities to generate and/or transmit the interference indicator. Thus, in accordance with the present invention, there may be provided a method to perform the logging by the user device, depending on whether the user device has capabilities to generate and/or transmit the interference indicator.

In addition, when the user device measures an LTE downlink, the device may detect that the downlink has been interfered by communication (e.g., in-device communication) based on another communication system. In this case, the operation of logging the measurement by the user device needs to be changed based on the degree of the interference. Thus, according to the present invention, a method is provided in which the user device performs the logging differently based on the degree of downlink interference.

SUMMARY OF THE INVENTION

The present invention provides a logging method performed by a user device in a wireless communication system, and a user device performing the method.

In an aspect, a method for performing logging by a user equipment in a wireless communication system is provided, The method may comprise determining whether downlink is affected by interference, determining whether to perform logging of measurement for the downlink, upon determination that whether the downlink is affected by the interference is unclear, and performing the logging based on the determination as to whether to perform the logging for measurement for the downlink.

The determination that whether the downlink is affected by the interference is unclear may be made when the downlink is affected by the interference by a value less than or equal to a pre-configured value.

The determination that whether the downlink is affected by the interference is unclear may be made when whether the downlink is affected by the interference is not determined and when a module in the user equipment is turned on to affect the measurement for the downlink.

Determining whether to perform logging of measurement for the downlink may include determining not to perform the logging of the measurement for the downlink on a frequency affected by the interference, and determining to perform the logging of the measurement for the downlink on a frequency not affected by the interference.

Determining whether to perform logging of measurement for the downlink may include determining to perform the logging of the measurement for the downlink, wherein the method includes transmitting, by the user equipment, information indicative of potential interference to a network, wherein the information indicating the potential interference is configured to indicate that the logged measurement is susceptible to being affected by the interference.

Determining whether to perform logging of measurement for the downlink may include determining not to perform the logging of the measurement for the downlink.

Determining whether to perform logging of measurement for the downlink may include determining to perform the logging of the measurement for the downlink.

The user equipment may be capable of using an in-device interference (IDC) indicator, wherein the IDC indicator includes information indicating that the user equipment has experienced IDC interference.

The downlink may be LTE (Long Term Evolution) downlink.

The interference may be caused by in-device communication.

In another aspect, a user equipment is provided. The UE may comprise a radio frequency (RF) unit configured for transmitting and receiving a radio signal, and a processor operatively coupled to the RF unit, wherein the processor is configured for determining whether downlink is affected by interference, upon determination that whether the downlink is affected by the interference is unclear, determining whether to perform logging of measurement for the downlink, and performing the logging based on the determination as to whether to perform the logging for measurement for the downlink.

According to one embodiment of the present invention, a logging method carried out by the user device in a wireless communication system and the user device using the same are provided.

According to one embodiment of the present invention, there may be provided a method to perform the logging by the user device, depending on whether the user device has capabilities to generate and/or transmit the interference indicator. In addition, according to the present invention, a method is provided in which the user device performs the logging differently based on the degree of downlink interference.

DESCRIPTION OF EXEMPLARY EMBODIMENTS

Figure 1:
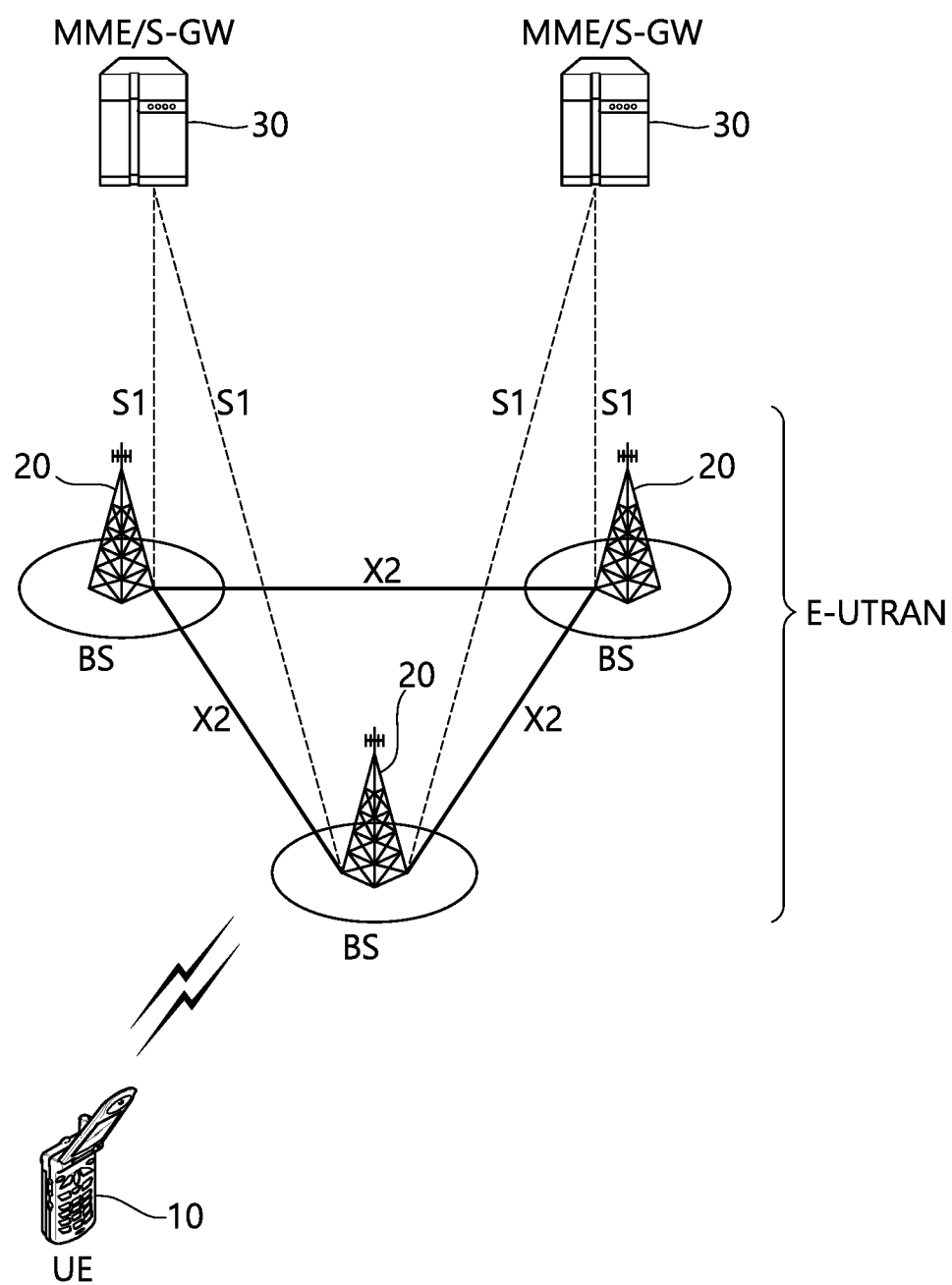
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system. [44] The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
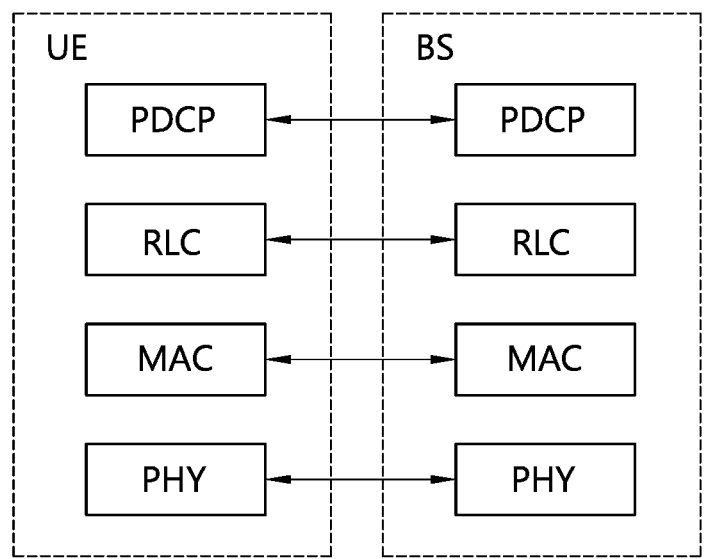
FIG. 2 is a diagram showing a wireless protocol architecture for a user plane.
Figure 3:
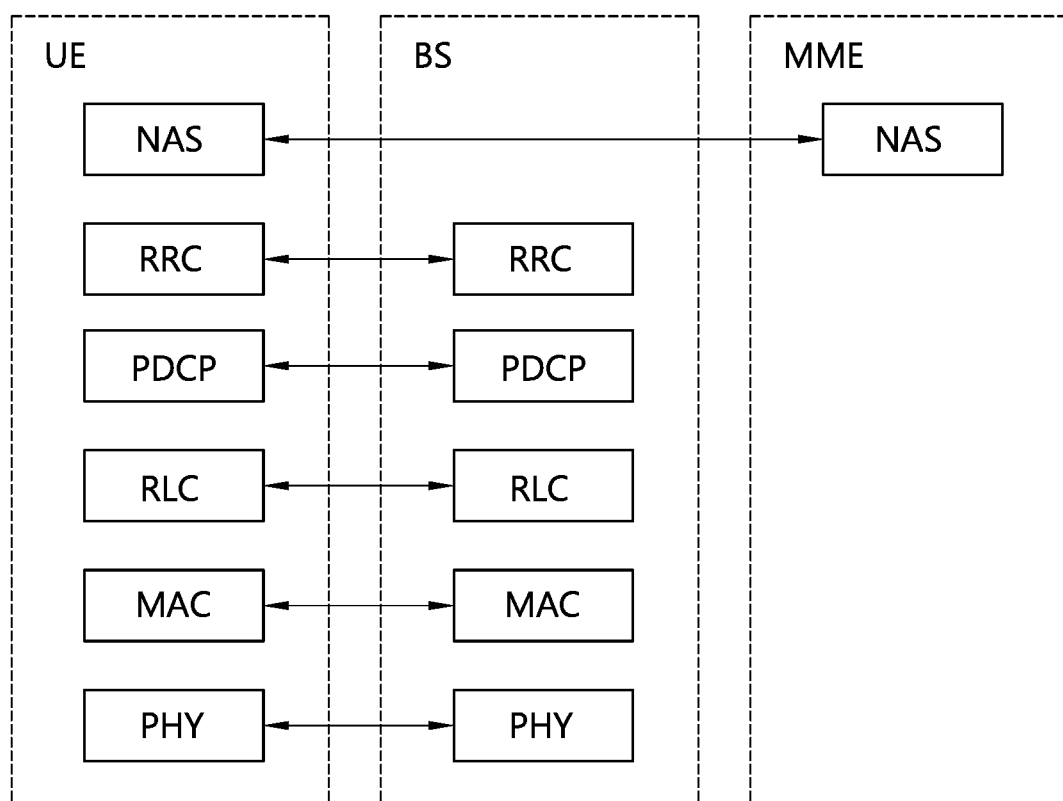
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
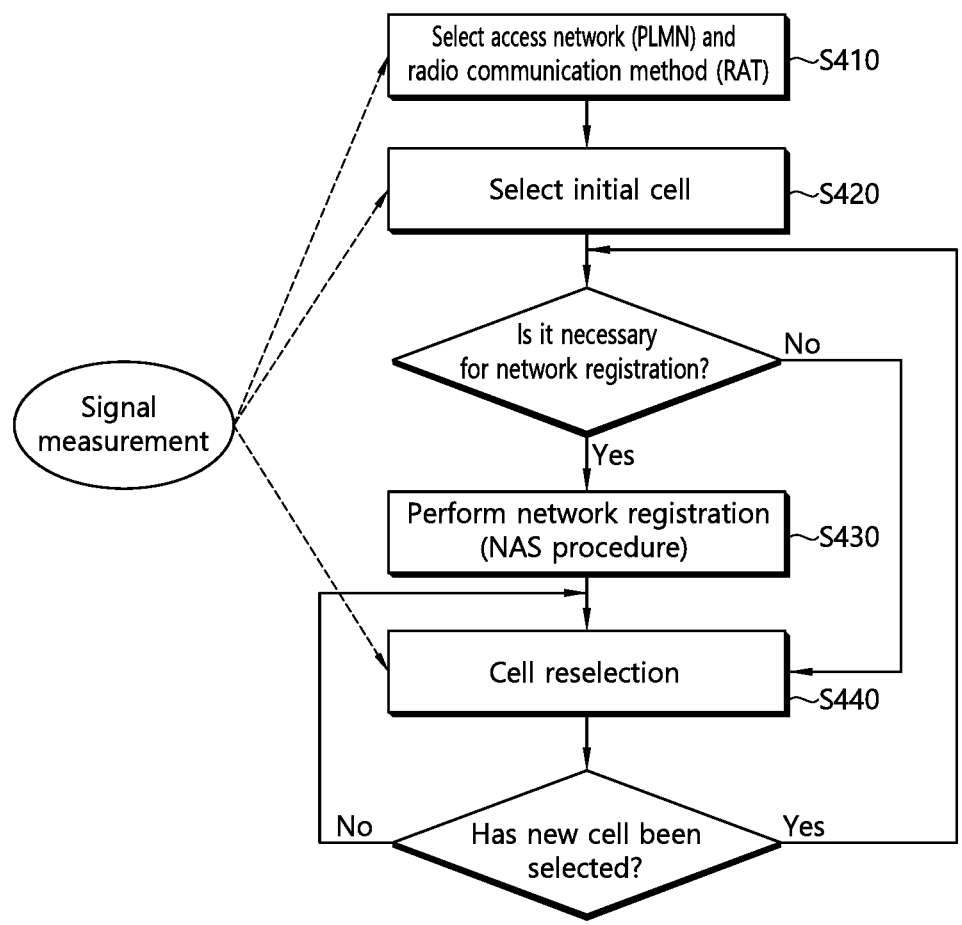
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
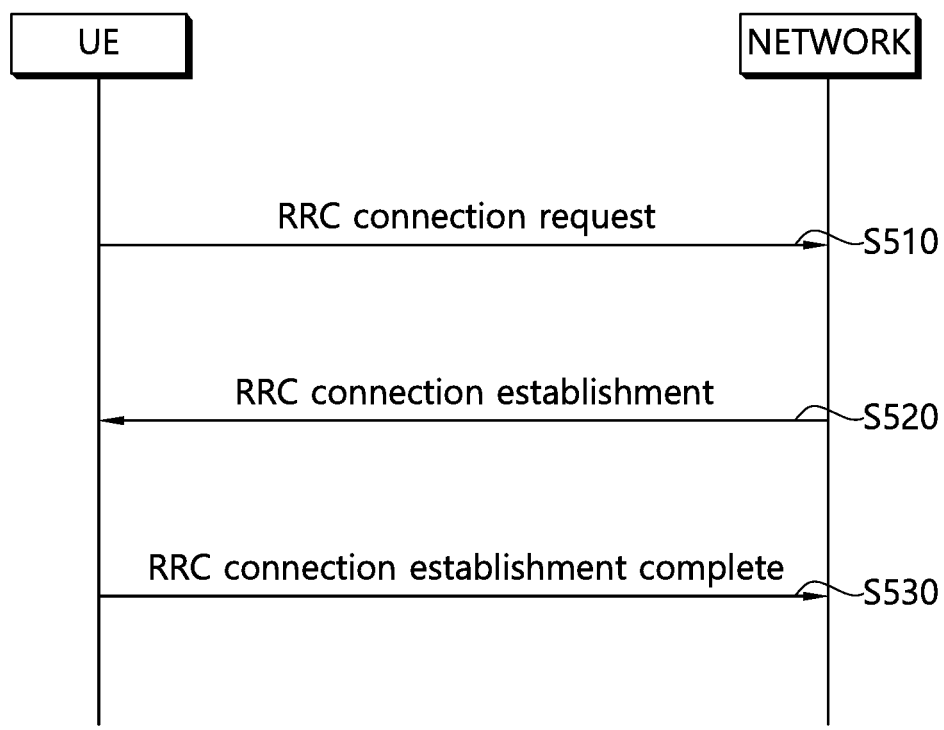
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
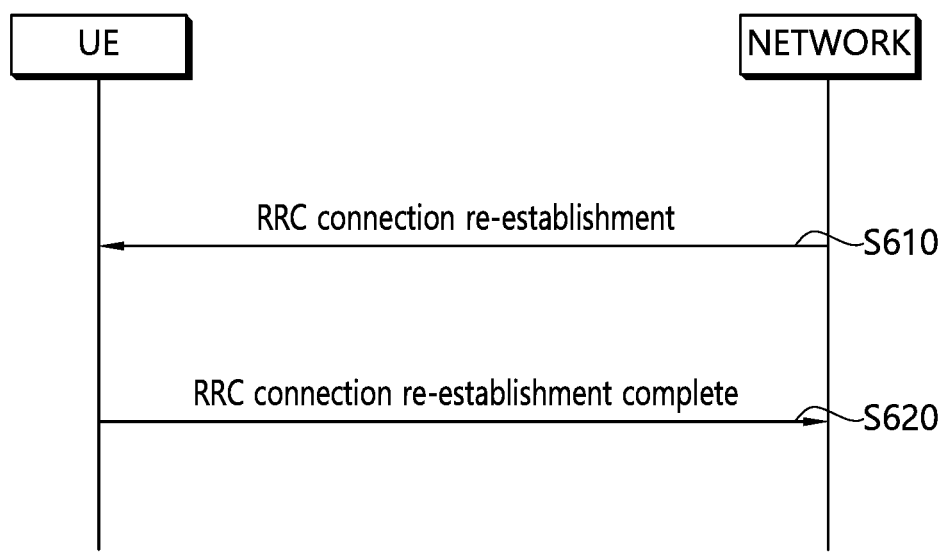
FIG. 6 is a flowchart illustrating an RRC connection reconfiguration procedure

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal. When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } Squal > 0 \quad \text{[Equation 1]}$$

where:

$$Srxlev = Q_{rxlevmeas} - (Q_{rxlevmin} + Q_{rxlevminoffset}) - P_{compensation}$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$Rs = Q_{meas,s} + Q_{hyst}, \quad Rn = Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described. UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
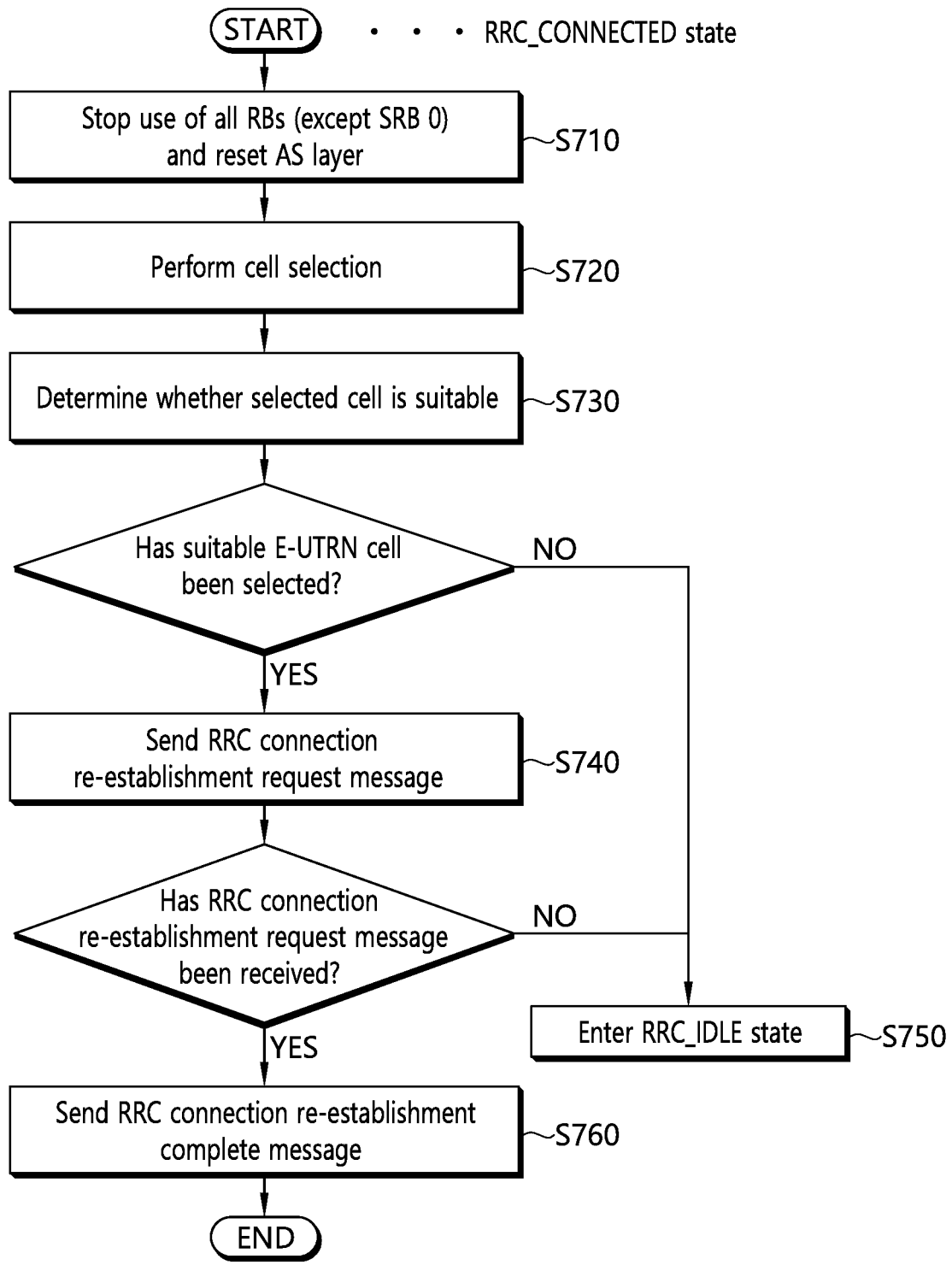
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer.

The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, the measurement and measurement report will be described.

In a mobile communication system, mobility support for the user device is essential. Therefore, the user device continuously measures the quality of the serving cell that provides the service currently and the quality of the neighboring cell. The user device reports the measurement result to the network at the appropriate time, and the network provides optimal mobility for the user device via handover. Often, measurements for this purpose are called radio resource management (RRM) measurements.

In addition to the purpose of supporting the mobility, in order to provide information that may help an operator to operate the network, the user device performs measurements for a specific purpose configured by the network, and thus, the device may report the measurement result to the network. For example, the user device receives broadcast information for a specific cell defined by the network. The user device may report the following information to the serving cell: a cell index (Cell ID) of the specific cell (also referred to as a global cell index), information (e.g., Tracking Area Code) identifying a location of the specific cell, and/or other cell information (e.g. whether the cell is a member of a closed subscriber group (CSG)) or not.

When the user device on the move has confirmed via the measurement that the quality of the specific cell is very bad, the user device may report location information and measurement results for the bad quality cells to the network. Thus, the network may optimize the network based on the report of the measurement result from the user devices that assists the operation of the network.

In a mobile communication system with a frequency reuse factor of 1, mobility occurs between different cells in the same frequency band. Therefore, to ensure the mobility of the user device, the user device should be able to accurately measure the quality and cell information about neighboring cells having a center frequency equal to the center frequency of the serving cell. The measurement of the neighboring cells having the center frequency equal to the center frequency of the serving cell may be referred to as intra-frequency measurement. The user device performs the intra-frequency measurement and reports the measurement result to the network at a suitable time. This achieves the objective associated with the corresponding measurement result.

The mobile communication operator may operate the network using a plurality of frequency bands. When a communication system service is provided using the plurality of frequency bands, in order to ensure optimal mobility for the user device, the user device should be able to accurately measure the quality and cell information of neighboring cells having a center frequency that is different from the center frequency of the serving cell. In this connection, the measurement of the cells having the center frequency different from the center frequency of the serving cell may be called an inter-frequency measurement. The user device must be able to perform inter-frequency measurements and report the measurement results to the network at the appropriate time.

When the user device supports measurement for a network based on a different RAT, the device may make a measurement on a cell of the corresponding network based on the base station configuration. Such measurement is referred to as an inter-RAT (Radio Access Technology) measurement. For example, the RAT may include a UMTS Terrestrial Radio Access Network (UTRAN) and a GSM EDGE Radio Access Network (GERAN) compliant with 3GPP standards. Further, the RAT may also include a CDMA 2000 system conforming to the 3GPP2 standard.

Figure 8:
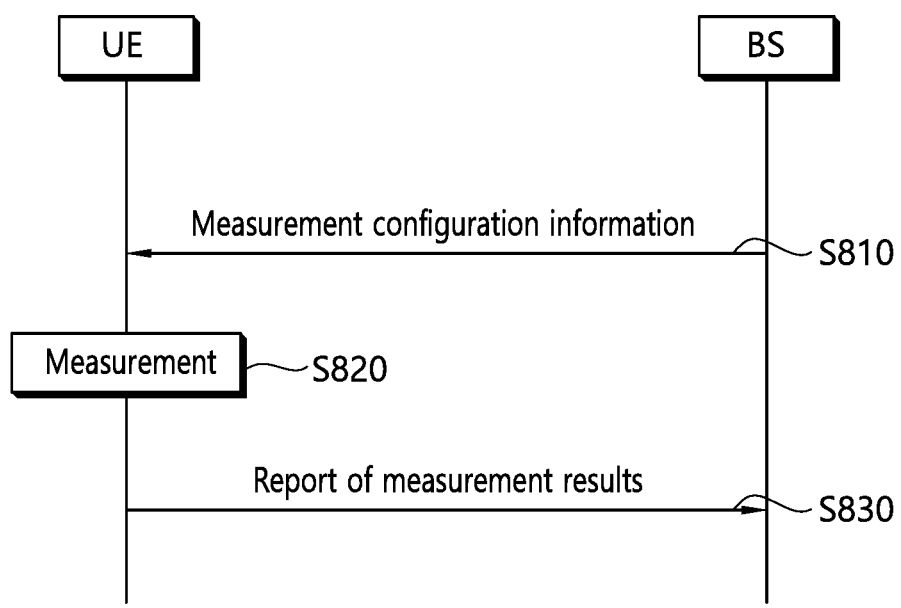
FIG. 8 is a flowchart illustrating a measurement method based on the prior art.

FIG. 8 is a flowchart illustrating a measurement method based on the prior art.

The user device receives measurement configuration information from the base station (S810). A message containing the measurement configuration information is referred to as a measurement configuration message. The user device performs measurement based on the measurement configuration information (S820). If the measurement result satisfies the report condition in the measurement configuration information, the user device reports the measurement result to the base station (S830). A message containing the measurement result is called a measurement report message.

The measurement configuration information may include the following information:

(1) Measurement target information: information about the target on which the user device performs the measurement. The measurement target may include at least one of an intra-frequency measurement target that is an intra-cell measurement target, an inter-frequency measurement target that is an inter-cell measurement target, and an inter-RAT measurement target. For example, the intra-frequency measurement target indicates a neighboring cell having the same frequency band as the serving cell. The inter-frequency measurement target indicates a neighboring cell having a frequency band different from the serving cell. The inter-RAT measurement target may indicate a neighboring cell of a RAT different from the RAT of the serving cell.

(2) Reporting configuration information: this information may include the report condition about when the user device reports the measurement result, and the report type. The report condition may include information about an event or a period triggering the measurement result report. The report type may refer to information on what type into the measurement result is to be constructed.

(3) Measurement identity information: This information associates the measurement target with the report configuration. The information is information about the measurement identity that allows the user device to determine what measurement target is to be reported and the repot type thereof and the report time thereof. The measurement identity information is included in the measurement report message, and, thus, the measurement identity information may indicate which measurement target the measurement result relates to, and under which report condition the measurement report occurred.

(4) Quantity configuration information: the information about the measurement unit, the report unit, and/or the parameters for configuring the filtering of the measurement result value.

(5) Measurement gap information: The information may be information about the measurement gap. The measurement gap may refer to a period in which downlink transmission or uplink transmission may not be scheduled, and, thus, the user device may be used to perform measurement only without considering data transmission with the serving cell.

The user device has a measurement target list, a measurement report configuration list, and a measurement identity list to perform the measurement procedure.

In 3GPP LTE, the base station may configure only one measurement target for one frequency band for the user device. The events that trigger the measurement report are defined as shown in the following table, in accordance with 5.5.4 clause in 3GPP TS 36.331 V8.5.0 (2009-03) "Evolved Universal Terrestrial Radio Access (E-UTRA) Radio Resource Control (RRC); Protocol specification (Release 8)":

TABLE 2

| Event | Report condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result from the user device satisfies the above configured event, the user device transmits the measurement report message to the base station.

Figure 9:
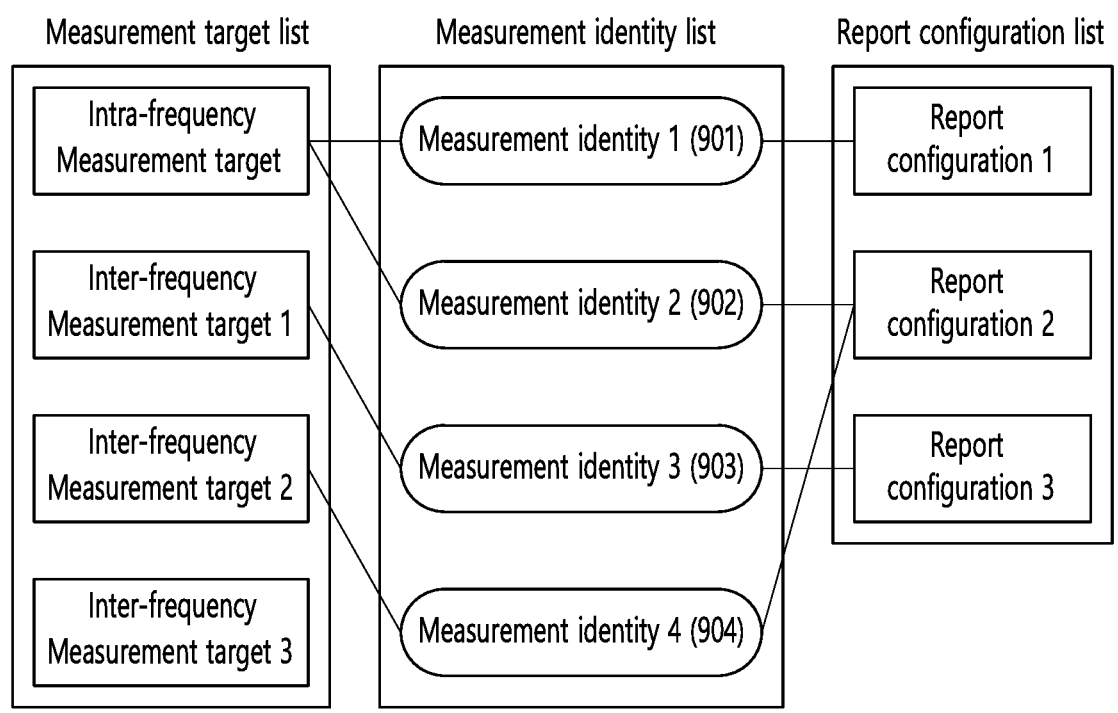
FIG. 9 shows an example of a measurement configuration configured for the user device.

FIG. 9 shows an example of a measurement configuration configured for the user device.

First, measurement identity 1 901 associates an intra-frequency measurement target with report configuration 1. The user device performs inter-cell measurement (intra-frequency measurement). The report configuration 1 may be used to determine the condition and report type for the measurement result report.

Measurement identity 2 902 is associated with the intra-frequency measurement target, like the measurement identity 1 901. However, measurement identity 2 902 associates the intra-frequency measurement target with report configuration 2. The user device performs the measurement, and the report configuration 2 is used to determine the condition and report type for the measurement result report.

Even when the measurement result for the intra-frequency measurement target satisfies any one of the report configuration 1 and report configuration 2 based on the measurement identity 1 901 and the measurement identity 2 902, the user device transmits the measurement result.

Measurement identity 3 903 associates inter-frequency measurement target 1 with report configuration 3. When the measurement result for the inter-frequency measurement target 1 satisfies the report condition contained in the report configuration 1, the user device reports the measurement result.

Measurement identity 4 904 associates inter-frequency measurement target 2 with report configuration 2. If the measurement result for the inter-frequency measurement target 2 satisfies the report condition contained in the report configuration 2, the user device reports the measurement result.

Meanwhile, the measurement target, report configuration and/or measurement identity may be added, changed and/or deleted. The measurement target, report configuration and/or measurement identity may be added, changed and/or deleted when the base station may send a new measurement configuration message to the user device or may send a measurement configuration change message.

Figure 10:
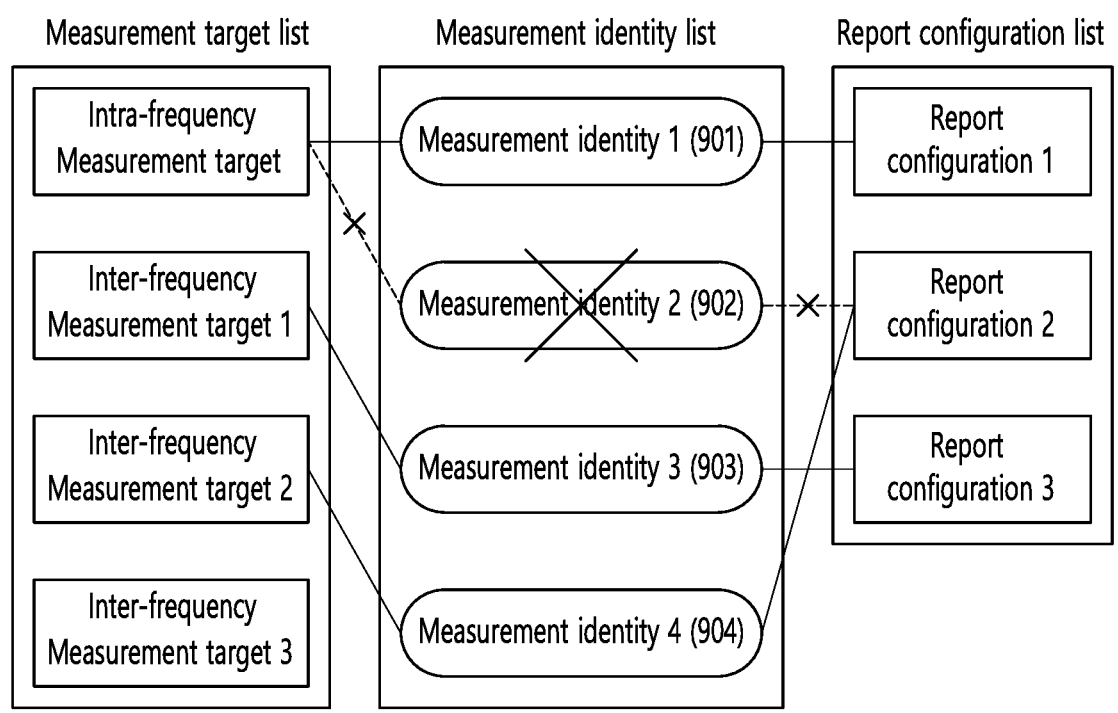
FIG. 10 shows an example of deleting the measurement identity.

FIG. 10 shows an example of deleting the measurement identity. When the measurement identity 2 902 is deleted, the measurement for the measurement target associated with the measurement identity 2 902 is stopped, and the measurement report thereof is not transmitted. The measurement target or report configuration associated with the deleted measurement identity may not be changed.

Figure 11:
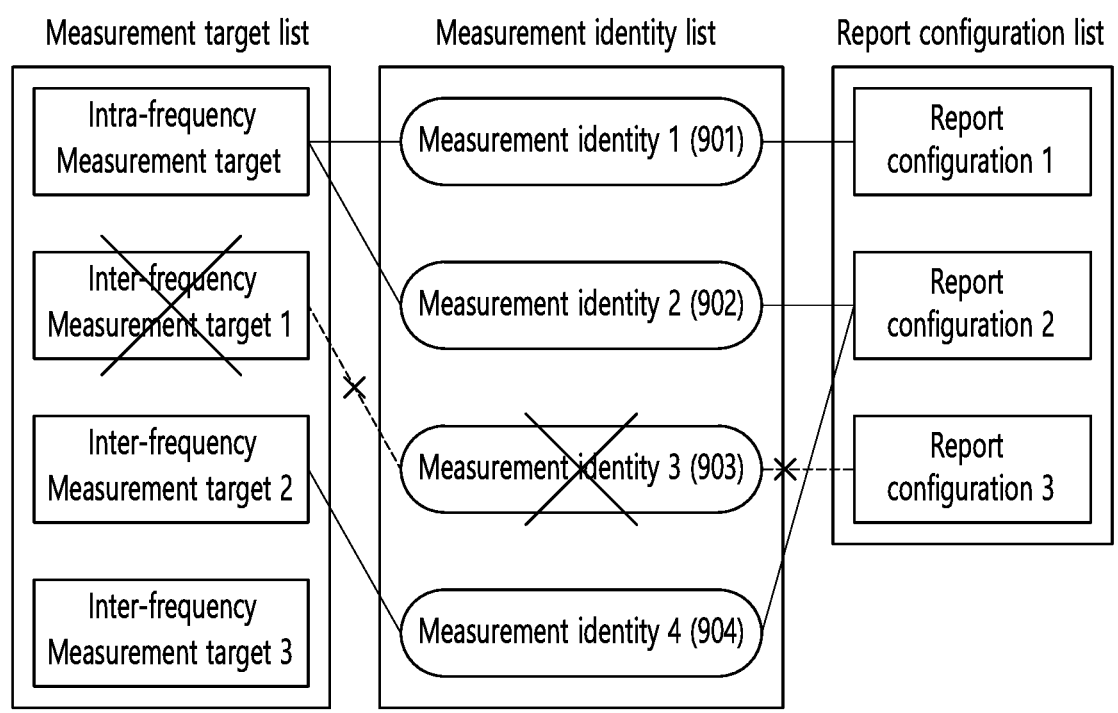
FIG. 11 shows an example of deleting the measurement target.

FIG. 11 shows an example of deleting the measurement target. If the inter-frequency measurement target 1 is deleted, the user device also deletes the measurement identity 3 903 associated with the inter-frequency measurement target 1. Thereby, the measurement for the inter-frequency measurement target 1 is stopped, and the measurement report thereof is not transmitted. However, the report configuration associated with the deleted inter-frequency measurement target 1 may not be changed or deleted.

When the report configuration is removed, the user device also removes the measurement identity associated with the report configuration. The user device interrupts the measurement of the measurement target associated with the measurement identity associated with the report configuration. However, the measurement target associated with the deleted report configuration may or may not be deleted.

The measurement report may include a measurement identity, a measured quality of a serving cell, and a measurement result of a neighboring cell. The measurement identity identifies the measurement target associated with the measurement report. The measurement result of the neighboring cell may include the cell index and measured quality of the neighboring cell. The measured quality may include at least one of a reference signal received power (RSRP) and a reference signal received quality (RSRQ).

Now, Minimization of Driving Tests (MDT) will be described.

In MDT, in order to optimize cell coverage, the user device performs the measurement of the quality of the corresponding cell and reports the measurement result thereof, instead of performing a conventional drive test in which operators use an automobile to measure the quality of the corresponding cell. The coverage depends on the location of the base station, the location of neighboring buildings, and the user's environment. In this connection, the operator must periodically test the drive, which requires a lot of cost and resources. To overcome this drawback, MDT is proposed in which the operator measures the coverage using the user device.

The operator collects MDT measurement values received from a plurality of user devices. Then, based on the collected values, the operator creates a coverage map indicating the distribution of service availability and quality of service over the entire region in which the operator provides the service. The map may be used for network operation and optimization. For example, when the operator receives a coverage issue in a specific area from the user device, the operator may increase the coverage of the corresponding area cell by increasing the transmission power of the base station providing the service to the corresponding area. This can minimize the time and cost of network optimization.

MDT is built on a framework of tracing function, one of the operator's tools for operation, administration, and maintenance (OAM). Using the tracing function, the operator can track the user device and log the behavior of the user device. This allows the operator to determine the main reason for malfunction in the user device. The traced data is collected on the network and the data is collected by a trace collection entity (TCE). The operator uses the data collected by the TCE for analysis and evaluation. The tracing functions used for MDT include tracing function-based signaling and tracing function based management. The tracing function-based signaling is used to activate the MDT operation for a specific user device, while the tracing function-based management is not limited to the specific user device but is used to activate MDT operations.

MDT may be classified as logged MDT and immediate MDT based on whether the log data that the user device measured and stored is reported in non-real time or in real time. In the logged MDT, the user device performs MDT measurement, logs the measurement data, and then transmits the logged data to the network. On the other hand, in immediate MDT, the device performs MDT measurement and immediately transmits the measurement data to the network. According to the logged MDT, the user device performs MDT measurement in the RRC idle state. According to the immediate MDT, the user device performs MDT measurement in the RRC connection state. Hereinafter, the logged MDT will be described in more detail.

Figure 12:
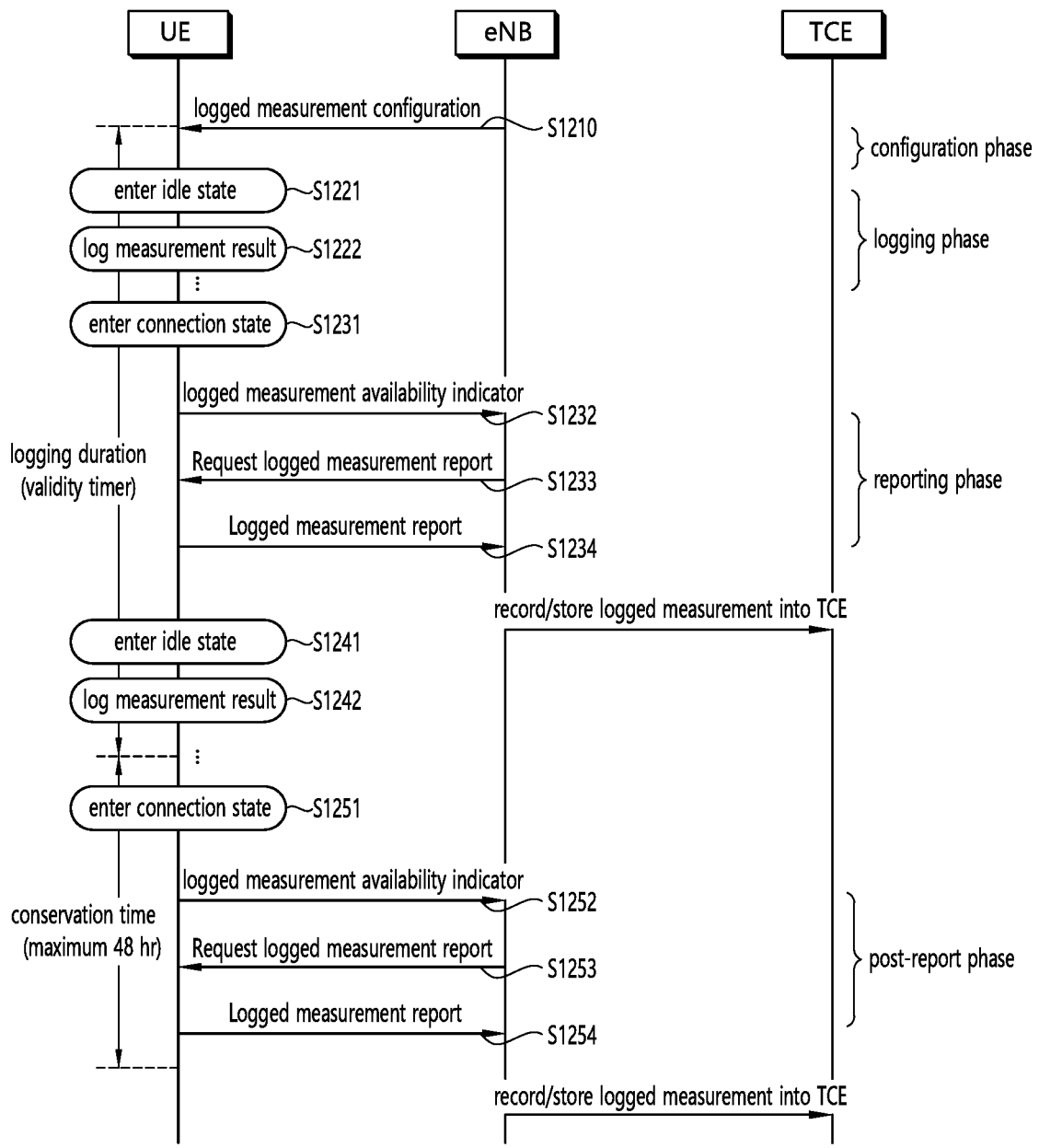
FIG. 12 is a flowchart illustrating a method of performing the logged MDT.

FIG. 12 is a flowchart illustrating a method of performing the logged MDT.

Referring to FIG. 12, the user device receives a logged measurement configuration (S1210). The logged measurement configuration may be included in the RRC message and then the RRC message may be transmitted using a downlink control channel. The logged measurement configuration may include at least one of the following information: TCE ID, information about the reference time to perform logging, logging duration, logging interval, information about area configuration, MDT PLMN list. The logging interval indicates the interval for storing the measurement result. The logging duration indicates the duration for which the user device performs the logged MDT. The reference time indicates a reference time for the duration for which the logged MDT is performed. The area configuration indicates the area for which the user device is requested to perform logging.

The MDT PLMN list may include at least one PLMN in which the user may perform the measurement and logging. The MDT PLMN list may include a subset of at least one EPLMN indicated by an EPLMN list known to the user device from the network via NAS signaling. The MDT PLMN list may be included in the logged measurement configuration and may include information identifying the PLMN. As described above, the information identifying the PLMN may include the MCC and MNC for the corresponding PLMN.

Meanwhile, when the user device receives the logged measurement configuration, the device initiates a validity timer. The validity timer means lifetime of the logged measurement configuration. The timer may be specified by information on logging duration. The duration of the validity timer indicates the valid lifetime of the logged measurement configuration. Further, the duration of the timer may indicate the validity of measurement results held by the user device.

The procedure in which the user device performs the logged measurement configuration and the corresponding procedures are performed is referred to as the configuration phase.

When the user device enters the RRC idle state (S1221), the user device logs a measurement result while the validity timer is running (S1222). The measurement result value may include RSRP, RSRQ, received signal code power (RSCP), Ec/No, and the like. In the following, information logging the measurement result may be called logged measurements and/or measurement result logs. The temporal interval during which the user device logs the measurement result at least once may be called the logging phase.

A scheme by which the user device performs the logged MDT based on the logged measurement configuration may vary based on the location of the user device.

Figure 13:
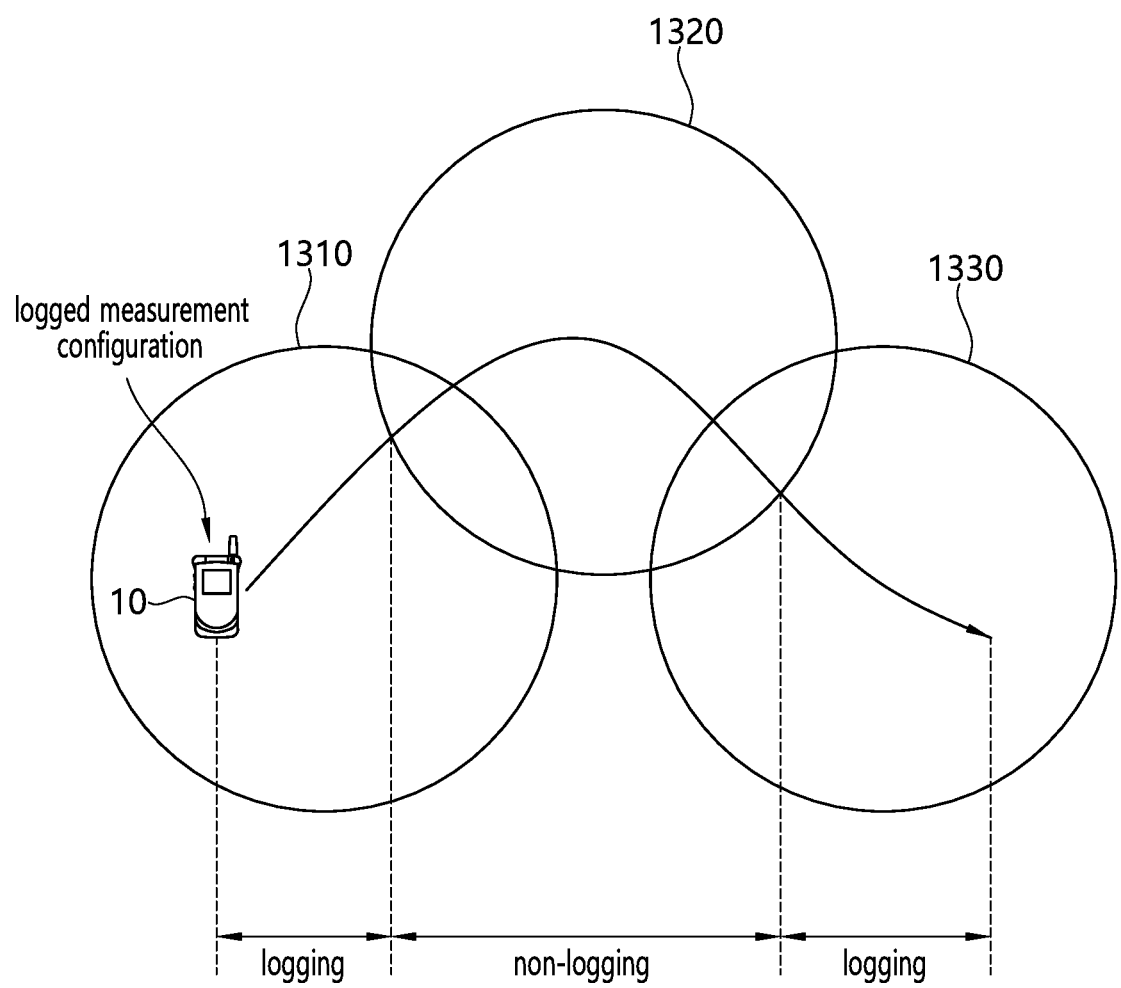
FIG. 13 is a diagram illustrating an example of the logged MDT based on the logging area.

FIG. 13 is a diagram illustrating an example of the logged MDT based on the logging area.

The network may also configure the logging area, which is the area in which the user device should perform logging. The logging area may be expressed as a cell list or as a tracking area/location area list. When the logging area is configured for the user device, the user device stops logging when the device is out of the logging area.

Referring to FIG. 13, a first area 1310 and a third area 1330 are areas configured as a logging area, while a second area 1320 is an area where logging is not allowed. The user device logs in the first area 1310, but does not perform logging in the second area 1320. When the user device moves from the second area 1320 to the third area 1330, the device performs logging again.

Figure 14:
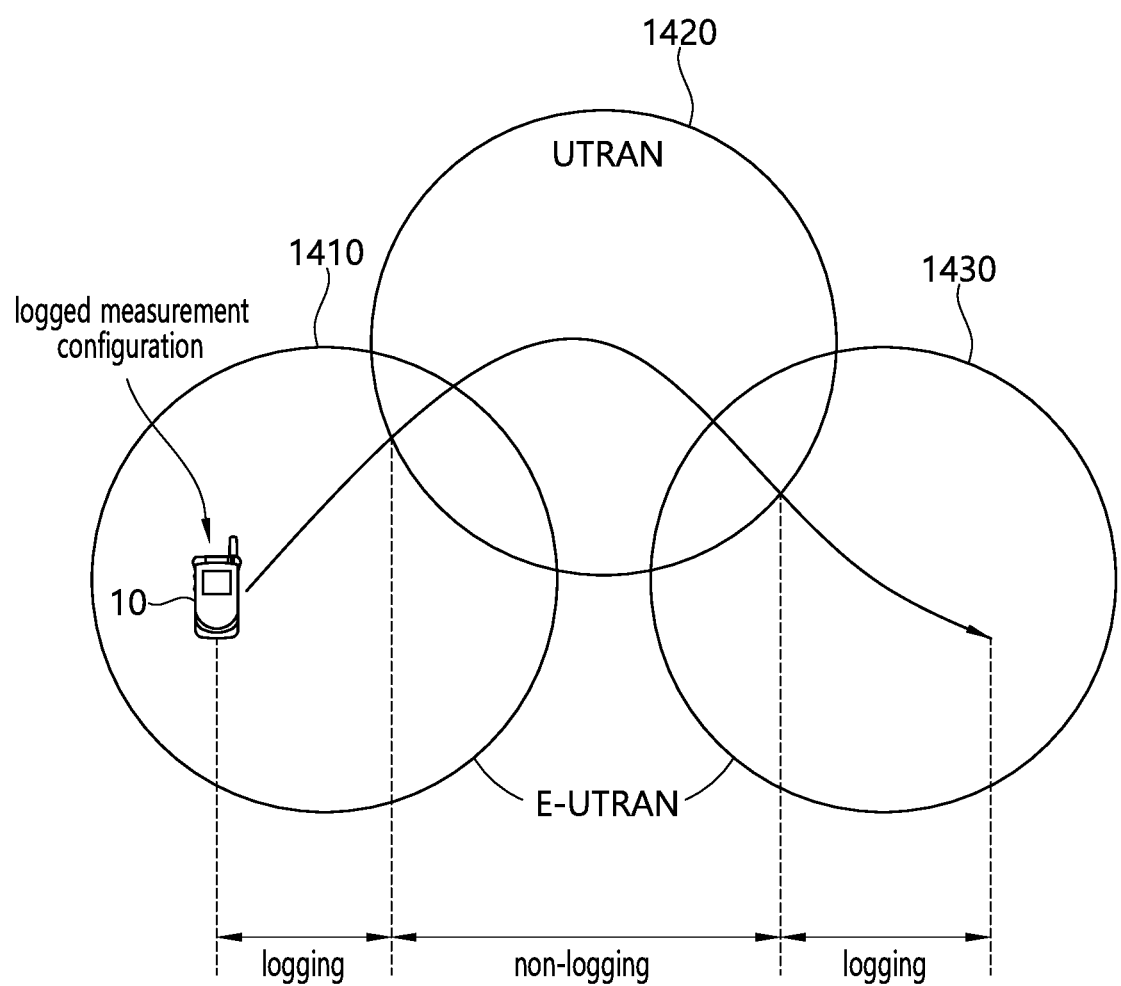
FIG. 14 is an illustration of an example of the logged MDT based on RAT change.

FIG. 14 is an illustration of an example of the logged MDT based on RAT change.

Only when the user device camps on the RAT that has received the logged measurement configuration, the device performs logging. Otherwise, the device stops logging when the device camps on another RAT. However, the user device may log cell information of RAT other than RAT on which the device camps.

The first area 1410 and the third area 1430 are the E-UTRAN area, and the second area 1420 is the UTRAN area. The logged measurement configuration is received from the E-UTRAN. When the user device enters the second area 1420, the device does not perform MDT measurement.

Referring to FIG. 13 and FIG. 14, the measurement and logging may be limited based on the logging area configured via the logged measurement configuration, and, at the same time, the user device may performs the measurement and logging based on the MDT PLMN list provided via the logged measurement configuration. The user device may perform measurement and logging for at least one cell based on a specific PLMN based on the MDT PLMN list, i.e., the RPLMN when receiving the logged measurement configuration. The device may perform measurement and logging for at least one cell based on at least one EPLMN indicated by the MDT PLMN list.

Referring again to FIG. 12, when the user device enters the RRC connection state (S1231) and there is a logged measurement to report, the user device informs the base station that there is a logged measurement to report (S1232). When the RRC connection is established, the RRC connection is re-established, or the RRC connection is reconfigured, the user device may inform the base station that the logged measurement exists. Further, when the user device performs a handover, the device may signal that there is a logged measurement for the handover target cell. The user device notifying the base station that the user device has the logged measurement is performed as follows: the device may include a logged measurement availability indicator, which is indication information indicating that the logged measurement exists, into the RRC message transmitted by the user device to the base station. The RRC message may be an RRC connection configuration completion message, an RRC connection reestablishment completion message, an RRC reconfiguration completion message, or a handover completion message.

When the base station receives a signal indicating that the logged measurement is present from the user device, the base station requests the user device to report the logged measurement to the base station (S1233). The request to report the logged measurement may be performed as follows: a logged measurement report request parameter about information indicating a request to report the logged measurement may be included in the RRC message and, then, the message may be transmitted to the device. The RRC message may be a UE information request message.

When the user device receives the logged measurement report request from the base station, the device reports the logged measurement to the base station (S1234). Reporting the logged measurements to the base station may be performed as follows: a logged measurement report including the logged measurements may be included in the RRC message and the RRC message may then be transmitted to the base station. The RRC message may be a UE information report message. At the time of reporting the user device reporting logged measurements, the device may report all of the logged measurements the user device has to the base station. Alternatively, the device may report only some of the logged measurements held by the user device to the base station. In the latter case, some of the reported logged measurements may be discarded.

The phase during which the user device notifies the base station that the logged measurement is present and receives the measurement report request from the base station, and thereby reports the logged measurement to the base station may be called the reporting phase.

The measurements by the user device while the logged MDT is performed mainly relates to the radio environment. MDT measurement may include cell index, cell signal quality and/or signal strength. MDT measurement may include measurement time and measurement location. The following table illustrates what the user device logs.

TABLE 3

| Parameter(set) | Description |
| --- | --- |
| Serving cell identity | global cell identity of Serving cell |
| Measured results of serving cell | Measured RSRP of serving cell |
| | Measured RSRQ of serving cell |
| measured results of neighbor cell) | Cell Identities of measured E-UTRA cells, Measured results of E-UTRA cells |
| | Cell Identities of measured UTRA cells, Measured results of UTRA cells |

TABLE 3-continued

| Parameter(set) | Description |
| --- | --- |
| | Cell Identities of measured GERAN cells, Measured results of GERAN cells |
| | Cell Identities of measured CDMA 2000 cells, Measured results of CDMA 2000 cells |
| Time stamp | The moment of logging measurement results, calculated as {current time minus absoluteTimeStamp} in second |
| location information | Detailed location information at the moment of logging |

Information logged at different logging times may be stored to be distinguished by different log entries, as shown below.

Figure 15:
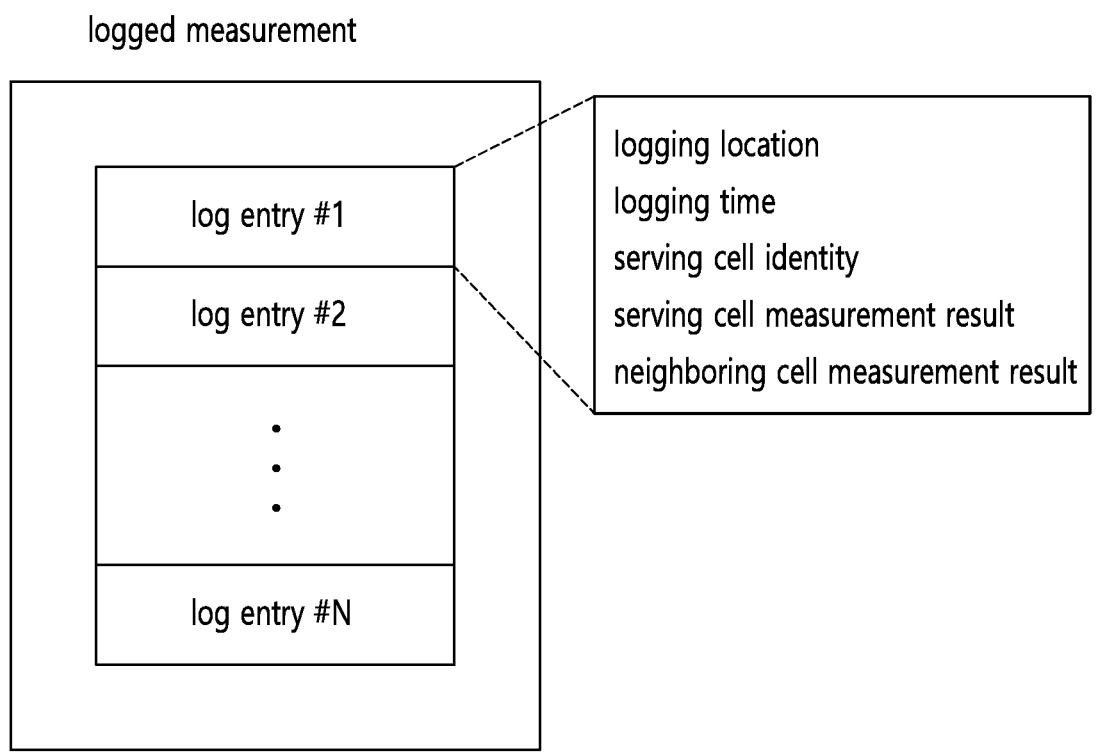
FIG. 15 is a diagram showing an example of logged measurements.

FIG. 15 is a diagram showing an example of logged measurements.

The logged measurements may contain one or more log entries.

The log entry includes a logging location, a logging time, a serving cell index, a serving cell measurement result, and a neighboring cell measurement result.

The logging location represents the location where the user device performed the measurement. The logging time represents the time at which the user device performed the measurement. Information logged at different logging times may be stored in different log entries.

The serving cell index may include a cell index (referred to as GCI (Global Cell Identity)) in layer 3. GCI may be a set of PCI (Physical Cell Identity) and PLMN index.

Meanwhile, the user device may analyze performance-related indicators of the user device in addition to the wireless environment and log these analysis results. For example, the analysis result may include throughput, erroneous transmission/reception rate, and the like.

Referring again to FIG. 12, within the logging duration, there may be a plurality of the aforementioned logging phase and report phases (S1241, S1242).

When the base station receives the logged measurement report, it may record/store the logged measurement report in the TCE.

After the validity timer has expired, that is, after the logging duration has elapsed, and if the user device has logged measurements that have not yet been reported, the user device performs a procedure for reporting the not-yet reported logged measurement to the base station. The phase in which all procedures related to the reporting the not-yet reported logged measurement are performed may be called the post-reporting phase.

After the logging duration is over, the user device discards the logged measurement configuration and initiates a conservation timer. After the logging duration is over, the user device discards the MDT measurement. However, already logged measurements are not discarded. The conservation timer represents the lifetime of the remaining logged measurement.

When the user device enters the RRC connection state (S1251) before the conservation timer expires, the device may report non-reported logged measurements to the base station. In this case, the above-mentioned procedure for the logged measurement report may be performed (S1252, S1253, S1254). When the conservation timer expires, the remaining logged measurements may be discarded. When the base station receives the logged measurement report, the base station may record/store the logged measurement report in the TCE.

The conservation timer value may be fixed to a specific value for the user device and may be configured to the user device in advance. For example, the value of the conservation timer may be 48 hours. Alternatively, the value of the conservation timer may be included in the logged measurement configuration and, then, the logged measurement configuration may be delivered to the user device. Alternatively, the value of the conservation timer may be included in another RRC message and, then, the message may be delivered to the user device. Meanwhile, when a new logged measurement configuration is delivered to the user device, the user device may update the previously logged measurement configuration with the newly obtained logged measurement configuration. In this case, the validity timer may be restarted from the time when the logged measurement configuration is newly received. Further, the logged measurement based on the previously logged measurement configuration may be discarded.

The logged MDT performed by the user device as described above may be implemented by performing the measurement and logging based on the MDT PLMN list included in the logged measurement configuration. Meanwhile, while the user device in the RRC_IDLE state is moving and performing the logged MDT, the EPLMN list for the user device may be newly configured. Further, the MDT PLMN list for the user device may also be newly configured. In this case, a discussion is made as to whether the log entry contained in the logged measurement obtained by the user device via the logging is valid until the MDT PLMN list and/or EPLMN list is changed.

1) When the EPLMN List is Changed

If the EPLMN list for the user device is changed via NAS signaling, issues related to the validity of the logged log entry until the list is changed may occur. At least one PLMN indicated by the MDT PLMN list may be configured as a subset of PLMNs indicated by the EPLMN list. This is because if the EPLMN list is changed, the specific PLMN in the MDT PLMN list as already configured may not be included in the changed EPLMN list. Thus, the log entry associated with the corresponding PLMN may no longer be valid.

2) When the MDT PLMN List is Changed

When the logged measurement configuration is newly configured, the user device may discard the previous logged measurement configuration and perform the logged MDT based on the new logged measurement configuration. However, if necessary, only the MDT PLMN list in the logged measurement configuration may be newly configured, and the user device may perform an existing logged MDT operation based on the new MDT PLMN list. When the MDT PLMN list is newly configured, the MDT PLMN list may be implemented as information providing MCC and MNC for the specific PLMN, and the MDT PLMN list may be implemented as information for providing an MCC or an MNC for the specific PLMN. If the MCC or MNC is provided, the user device may identify the corresponding PLMN via a reference PLMN, as described above. The log entry associated with the PLMN not included in the new MDT PLMN list may no longer be valid.

The in-device coexistence (IDC) will be described below.

In order for a user to access the various networks anytime and anywhere, one user device may include a global navigation satellite system (GNSS) receiver, including a transceiver for wireless communication systems such as LTE, WiFi, Bluetooth, etc. For example, in order to receive a VoIP service and a multimedia service using a BT device, the user device may include an LTE module and a BT module. In addition, the user device may include an LTE module and a WiFi module for traffic distribution. Also, the user device may include a GNS module and an LTE module to additionally obtain location information.

In this way, because of the proximity between multiple transceivers within a single user device, it may happen that the power transmitted from one transmitter is greater than the reception power of another receiver. By using filter techniques or by spacing use frequencies, interference (IDC interference) between both transceivers may be prevented from occurring. However, if multiple wireless communication modules operate on adjacent frequencies in a single user device, current filter techniques cannot adequately remove interference. Thus, for the coexistence between the transceivers for a plurality of wireless communication modules in the user device, it is necessary to solve the above problem.

Figure 16:
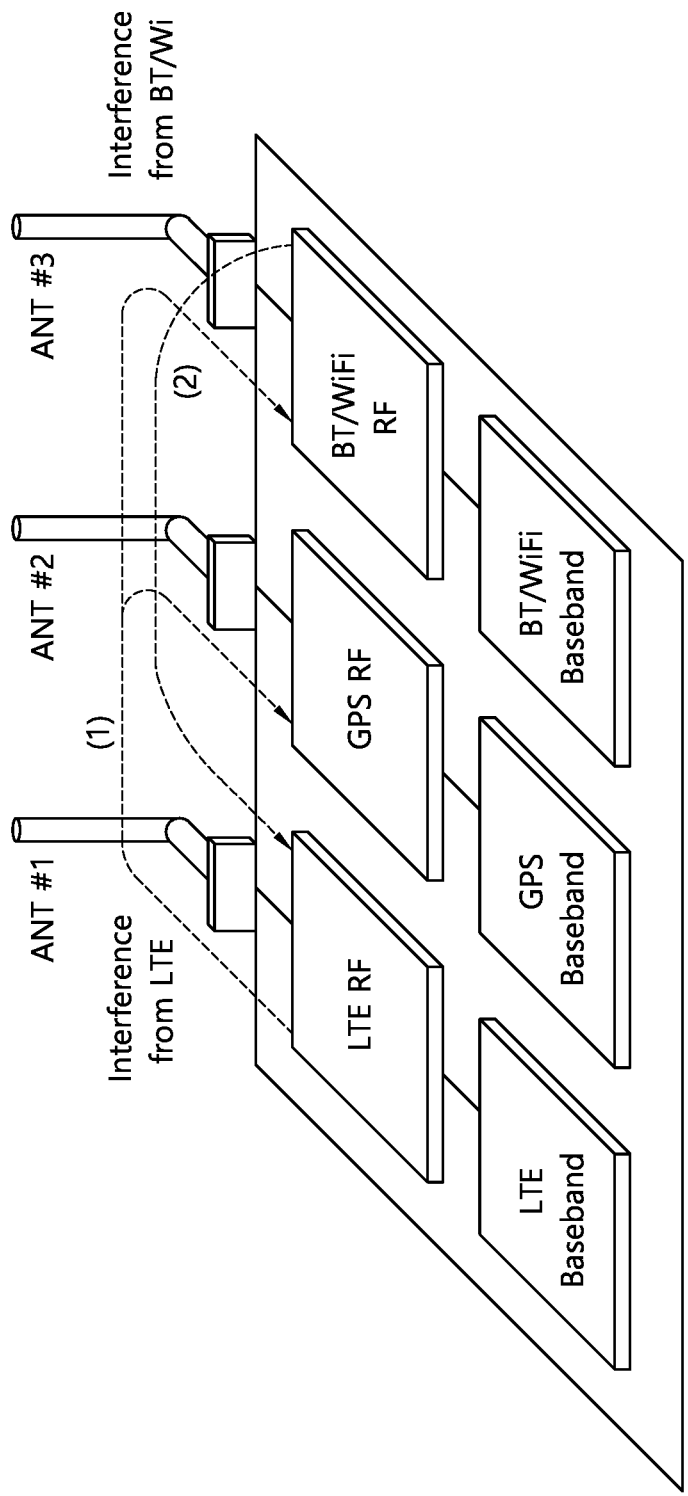
FIG. 16 shows a situation where mutual interference may occur in an IDC environment in which LTE, GPS, and BT/WiFi communication modules coexist in a single user device.

FIG. 16 shows a situation where mutual interference may occur in an IDC environment in which LTE, GPS, and BT/WiFi communication modules coexist in a single user device.

Depending on whether there is coordination between the LTE module and another communication module coexisting with the LTE module, and whether there is coordination between the LTE module and the base station for IDC interference resolution, IDC interference avoidance mode may be classified into three modes as follows. In the first mode, there is no coordination to avoid IDC interference between coexisting communication modules and between LTE and network. In this case, since the LTE module does not know information about another communication module coexisting with the LTE module, the LTE module may not properly handle the degradation of service quality due to IDC interference. In the second mode, there may be coordination between communication modules coexisting within the user device. In this second mode, the on/off state of the modules, the traffic transmission state thereof, etc. may be transparent between the coexisting modules. However, there is no coordination between the user device and the network. Finally, in the third mode, there is a coordination between the coexisting modules in the user device, and there is coordination between the user device and the network. In the third mode, the coexisting modules may know the ON/OFF state and the traffic transmission state of the other modules. The user device informs the network of the IDC interference status. As a result, the network makes decisions and takes action to avoid IDC interference.

As described above, the LTE module may perform coordination with another module in the user device and measure IDC interference via inter/intra frequency measurement.

The interference may be IDC interference that occurs when different communication modules coexist within a single user device. IDC interference may occur in the following coexistence situations:

Interference occurs when LTE and WiFi coexist.
Interference occurs when LTE and BT coexist.
Interference occurs when LTE and GNSS coexist.

Communication modules may also provide interference to each other by operating on adjacent frequencies, as follows.

LTE TDD operates at Band 40 (2300 MHz to 2400 MHz) while WiFi and BT may operate in unlicensed band (2400 MHz to 2483.5 MHz). In this case, LTE-based transmissions may interfere with WiFi and BT-based communications, or WiFi or BT-based transmissions may cause interference to LTE-based reception.

LTE FDD performs uplink transmission in Band 7 (2500 MHz to 2700 MHz) while WiFi, and Bluetooth operate in the unlicensed band (2400 MHz to 2483.5 MHz). In this case, LTE based uplink transmission may cause interference to WiFi or Bluetooth based reception.

LTE FDD performs uplink transmission at Band 13 (UL: 777-787 MHz, DL: 746-756 MHz) or Band 14 (UL: 788-798 MHz, DL: 758-768 MHz), while GPS radios may also perform signal reception at 1575.42 MHz. In this case, LTE based uplink transmission may cause interference to GPS reception.

Currently, in order to solve IDC interference in 3GPP, there are two main directions as follows: The first approach allows a communication module that provides interference, or a communication module that receives interference to changes the frequency (Frequency Division Multiplexing (FDM)). The second method is a method (Time Division Multiplexing (TDM)) in which communication modules coexisting each other may use one frequency in time division manner.

If the internal interference between the LTE module in the user device and another ISM band module in the user device, that is, IDC interference, is detected, the user device may transmit the IDC indicator to the network. The IDC indicator may indicate that the user device has experienced IDC interference. The IDC indicator may include information on a specific frequency and/or time period pattern. In this connection, the specific frequency information may serve as a basis for performing the FDM to solve the IDC interference issue. Information on the specific time period pattern may act as a basis for performing TDM. The specific frequency information may indicate a frequency at which IDC interference occurs. Information on the specific time period pattern may indicate a time period during which IDC interference occurs due to operation of another ISM band module.

The present invention will be described below.

As described above, in order to allow the user to access the various networks anytime and anywhere, a single user device may be equipped with a global navigation satellite system (GNSS) receiver, including transceivers for wireless communication systems such as LTE, WiFi, Bluetooth, etc. That is, one user device may perform LTE downlink while simultaneously communicating using another communication system (for example, WiFi, Bluetooth, etc.). That is, while the user device is performing LTE downlink, communication may be performed based on another communication system included in the user device. Accordingly, the LTE downlink of the user device may be interfered by communication based on said another communication system.

The user device may also know via measurement that the LTE communication of the user device has been interfered by communication based on another communication system. If the user device finds that the LTE communication of the user device has been interfered by communication based on another communication system, the user device may transmit an interference indicator to the network.

However, the user device is not always able to generate the interference indicator and transmit the indicator to the network. Thus, it is necessary for the user device to vary the operation of logging the measurement (or measurement result), depending on whether the user device has capabilities to generate and/or transmit the interference indicator. Thus, in accordance with the present invention, there may be provided a method to perform the logging by the user device, depending on whether the user device has capabilities to generate and/or transmit the interference indicator.

In addition, when the user device measures an LTE downlink, the device may detect that the downlink has been interfered by communication (e.g., in-device communication) based on another communication system. In this case, the operation of logging the measurement by the user device needs to be changed based on the degree of the interference. Thus, according to the present invention, a method is provided in which the user device performs the logging differently based on the degree of downlink interference.

Hereinafter, it is assumed that the LTE downlink receives an interference by another in-device module for convenience of explanation, but the present invention is not limited thereto. This is merely for convenience of explanation. That is, the present invention may be applied even when the LTE downlink is interfered by the in-device module, and, further, the present invention is also applicable to a case where downlink (or channel) based on next generation communication (for example, 5 g) is interfered by the in-device module.

In the following, the logging operation of the user device will be described based on I. a case when the user device has capabilities (for example, capabilities to generate and/or transmit IDC indicators) that can use the IDC indicator, and II. a case when the user device does not have the capabilities to use this IDC indicator.

I. If the user device has the capabilities to use the IDC indicator

If the user device has the capabilities to use the IDC indicator, the user device may also detect whether the (LTE) downlink is affected by the ISM module transmission. That is, the user device detects or determine whether the downlink is affected by the ISM in-device module transmission (that is, whether the downlink of the user device is subject to interference by the ISM in-device module transmission).

In this connection, based on the degree of interference detected by the user device, the user device may determine the scheme that performs the logging. In the following: the invention will be described under following three scenarios: 1. If it is determined that downlink is not interfered by ISM module transmission; 2. If downlink is determined to be interfered by ISM module transmission; and 3. If downlink is likely to be interfered by ISM module transmission, but, in fact, it is unclear whether the interference is significant.

1. If it is determined that downlink is not interrupted by ISM module transmission FIG. 17 is a sequence of the logging method according to one embodiment of the present invention.

Figure 17:
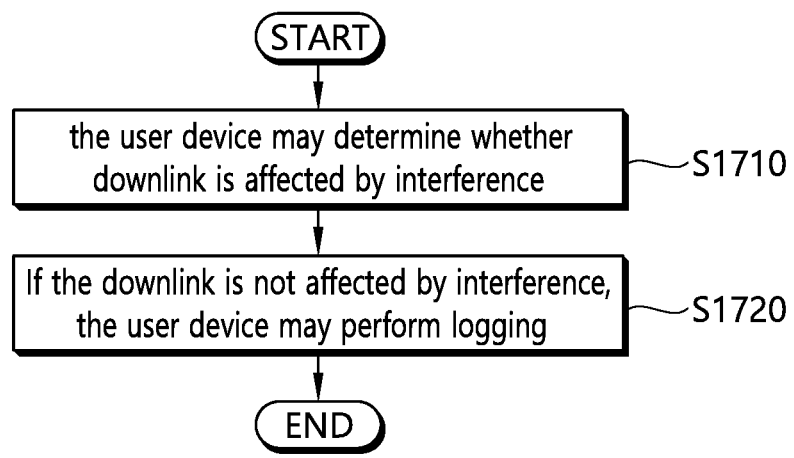
FIG. 17 is a sequence of the logging method according to one embodiment of the present invention.

According to FIG. 17, the user device may determine whether downlink is affected by interference (S1710). In this connection, the downlink may mean LTE downlink, or it may mean downlink of a communication system according to the next generation standard. In addition, the interference may mean interference due to ISM module transmission, as described above.

If the downlink is not affected by interference, the user device may perform logging (S1720).

More specifically, if the user device determines that the downlink (e.g., LTE downlink) measurement of the user device is not corrupted, the user device may perform logging (for example, normal logging). In this connection, the downlink measurement of the user device is corrupted may mean that there is no ISM module transmission. Alternatively, the downlink measurement of the user device is not corrupted may mean that there is no ISM module transmission affecting downlink (for example, LTE downlink) measurement.

2. If downlink is determined to be interfered by ISM module transmission

Figure 18:
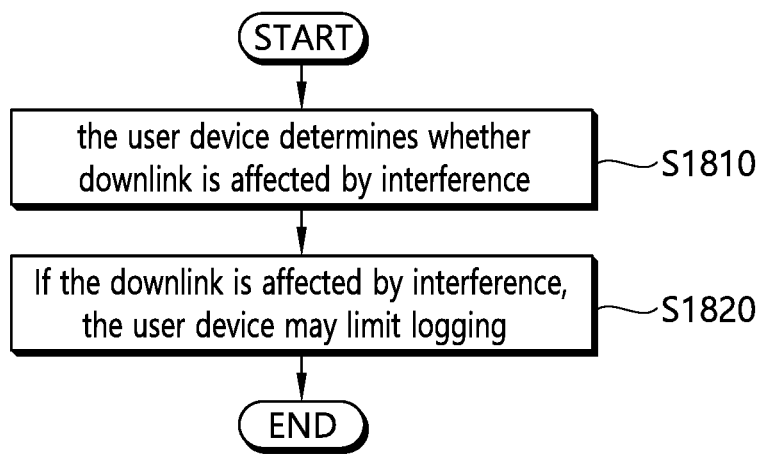
FIG. 18 is a sequence of the logging method according to another embodiment of the present invention.

FIG. 18 is a sequence of the logging method according to another embodiment of the present invention.

Referring to FIG. 18, the user device determines whether downlink is affected by interference (S1810). In this connection, the downlink may mean LTE downlink, or it may mean downlink of a communication system according to the next generation standard. In addition, the interference may mean interference due to ISM module transmission as described above.

If the downlink is affected by interference, the user device may limit logging (S1820). For example, when the user device determines that the user device's downlink measurement is definitely corrupt, the user device may not perform logging to prevent the user device from providing a logging entry containing the corrupted measurement to the base station. In this connection, the user device's downlink measurement is definitely corrupt may mean that the downlink frequency band is adjacent to the ISM band or the ISM band, and the frequency of ISM module transmissions is very high (for example, the sum of the times used for ISM transmissions within a certain time period is above the threshold value), and/or that ISM module transmission power is above the threshold value.

More specifically, if the downlink measurement of the user device is corrupted, in order not to log downlink measurements determined as corrupted by interference to the log entry, the user device may skip logging. That is, if the user device determines that the E-UTRA downlink measurement is corrupt, the user device does not perform logging (that is, the user device does not add any harmful log entries).

In one example, as soon as the user device transmits the IDC indicator due to interference from the in-device module to the LTE, the user device may determine that the downlink measurement has been corrupted, thereby inhibiting logging, as described above.

In one example, the user device may disable logging until the user device receives from the network a resource pattern (for example, a TDM resource pattern) distinguished by times used by LTE and by the in-device module.

3. If downlink is likely to be interfered by ISM module transmission, but it is unclear that interference is actually significant FIG. 19 is a sequence of a method for performing logging according to another embodiment of the present invention.

Figure 19:
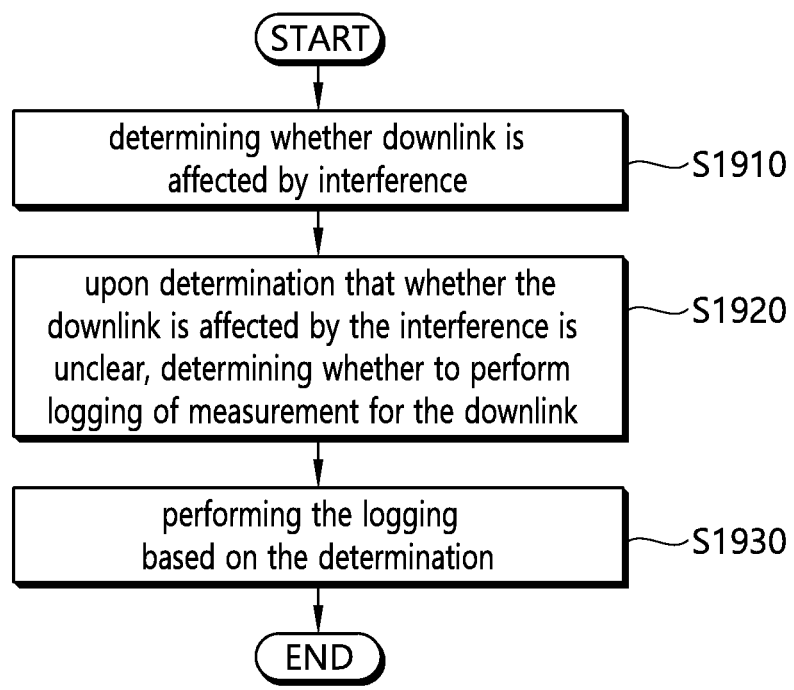
FIG. 19 is a sequence of a method for performing logging according to another embodiment of the present invention.

According to FIG. 19, the user device determines whether downlink is affected by interference (S1910). In this connection, a specific example for determining by the user device whether downlink is affected by interference will be described later.

If it is determined that the downlink is affected by the interference, the user device determines whether to perform logging (S1920). That is, if downlink is susceptible to interference by ISM module transmission, but it is unclear that interference is actually significant, the user device may also determine whether to perform logging.

More specifically, i) when the user device may determine that the downlink is relatively slightly corrupted by interference, or ii) when the user device may not determine whether the downlink measurement has been definitely corrupted by the interference and when the user device knows that the ISM in-device module, which may affect downlink measurements, is turned on, the following options may apply.

1) Option 1:

The user device may not perform logging. When it is unclear whether downlink is affected by interference, and if the user device does not perform any logging, the network may receive or have non-corrupted measurement logs. When following this option, the number of logged measurements may be reduced, thereby reducing the amount of information the network collects. As the number of measurements logged by the user device decreases, (the network receives un-corrupted measurement logs), and, further, the amount of traffic the user device transmits to the network is reduced, which may reduce the congestion of the wireless communication system.

2) Option 2:

When the user device has detected that the frequency (for example, LTE frequency) for performing the LTE communication is affected by interference (for example, IDC interference), and the interference to the frequency is not severe, the user device does not perform logging only for frequencies affected by the interference, but, the device may also perform logging of measurement results for another frequencies that are not heavily affected by the interference. That is, the user device maintains the opportunity to perform logging for another frequency that is not affected by the ISM module transmission and to provide the logged measurement result to the network. The device may not provide the network with a log entry for the frequency affected by the interference (that is, corrupted by interference).

In summary, the user device does not perform the logging of the frequency affected by the interference (if the interference to the frequency is not severe), while the device may perform logging on other frequencies except for the frequency affected by the interference.

This is because when the interference to the specific frequency is not severe and the influence of the interference on the remaining frequencies other than the specific frequency may be insignificant, omission (or restriction) of the logging for the frequency of the user device that has received little effect of interference may lead to inefficiency in terms of logging performance.

Thus, in accordance with this option, since the user device may perform logging for frequencies that receive little effect from the interference and may include the measurement results thereof in the log entries, the network may acquire a larger number of more accurate measurement results (compared to the case of omitting all loggings).

3) Option 3:

The user device may perform logging. In this case, the network may actually acquire a corrupted logged measurement. This option may also be used when the network device can recognize a corrupted measurement result even when a corrupted measurement result is contained in the measurement result reported by the user device.

4) Option 4:

The user device may indicate a flag that indicates potential interference to the log entry of interest. That is, the user device may transmit information (for example, flag) to the network indicating potential interference. In this connection, the information indicating the potential interference may be included in the log entry of interest, or may be separate from the log entry. The presence of the flag for the entry of interest may be necessary to determine whether the network will take the measurement result received from the user device, or discard the measurement results included in the log entry of interest to optimize the coverage. That is, the network may determine, based on the flag for the entry of interest, whether to remove the measurement result contained in the log entry or use the measurement result. If the network wants coverage optimization, the network may remove the measurement result contained in the log entry (that is, the log entry indicated by the information indicating the potential interference). To the contrary, when the network does not want coverage optimization, the network may use the measurement result included in the log entry.

In one example, if the measurement result has excessively different values compared to the measurement result taken before or after the measurement of interest (for example, if measurement result values for a measurement of interest are different from each other by a value greater than or equal to a specific value (for example, threshold) compared to measurement result values for another measurements), the network may remove the log entries containing the measurement results for the measurement of interest (alternatively, the network may choose to remove the log entries). Otherwise, for example, if the measurement result has slightly different values compared to the measurement result taken before or after the measurement of interest (for example, if measurement result values for a measurement of interest are different from each other by a value smaller than a specific value (for example, threshold) compared to measurement result values for another measurements), the network may use the log entries containing the measurement results for the measurement of interest (alternatively, the network may choose to use the log entries).

5) Option 5:

Alternatively, when it is unclear whether downlink is affected by interference, the network may control the operation of the user device. For example, if it is unclear whether downlink is affected by interference, the network may transmit to the user device an indication of whether the user device is to perform logging. In this connection, the indicator may include information on which of the above-described options 1 to 4 the user device is to perform. After receiving the indicator, the user device may perform an operation corresponding to the option indicated by the indicator.

Thereafter, the user device performs logging based on the determination (S1930). That is, the user device may perform logging based on the determination between the options. In this connection, details about whether or not the user device performs logging, and if logging is performed, how to perform the logging using which option among the above options are as described above.

For convenience of description, the above description is mainly described in terms of the user device, but the above description may also be described in terms of the network. The following description of the drawings may refer to descriptions of the details of the present invention described above in terms of the network.

Figure 20:
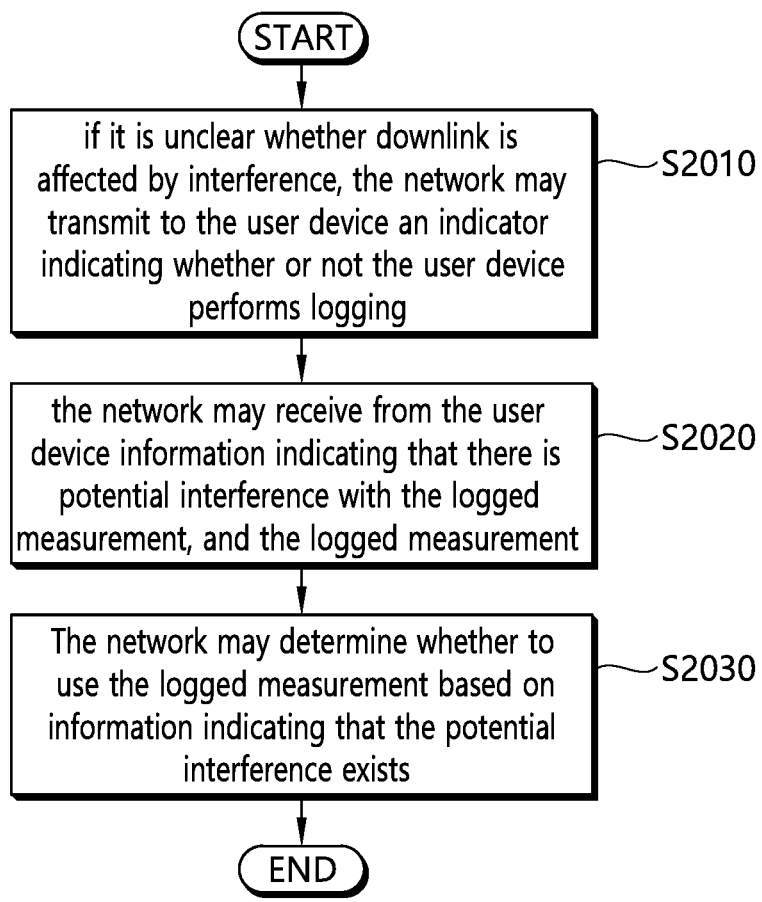
FIG. 20 is a flowchart of a management method of logged measurements by a network according to one embodiment of the present invention.

FIG. 20 is a flowchart of a management method of logged measurements by a network according to one embodiment of the present invention.

According to FIG. 20, if it is unclear whether downlink is affected by interference, the network may transmit to the user device an indicator indicating whether or not the user device performs logging (S2010). In this connection, the details of the indicator that the network transmits to the user device are as described above.

Separately or in conjunction with transmitting the indicator, the network may receive from the user device information indicating that there is potential interference with the logged measurement, and the logged measurement (S2020). That is, the network may receive information indicating that there is potential interference with the logged measurement, and the logged measurement from the user device, irrespective of transmitting the indicator. In this connection, details of the information received by the network are as described above.

The network may determine whether to use the logged measurement based on information indicating that the potential interference exists (S2030). In this connection, specific examples for determining whether or not to use logged measurement are as described above.

II. When the user device does not have the capabilities to use the IDC indicator If the user device does not have the capabilities to use the IDC indicator, the user device does not detect whether the LTE downlink measurement is affected by the ISM in-device module transmission.

If the logged MDT is configured for the user device (not having capabilities to detect whether the downlink measurement is affected) and when a potential in-device interference occurs (for example, WLAN and/or BT module is turned on), the user device will stop logging. In general, the user device may not consider any in-device module transmission for MDT logging. In this connection, only the logged MDT operation follows. In general, when a potential in-device interference occurs (for example, WLAN and/or BT module is turned on), when deciding not to consider any in-device module transmission for MDT logging according to Option 1 or Option 2 described above, the network may also configure the user device to stop logging. The network may also configure the user device to not include logged measurement results for a specific frequency or specific frequency band. In this case, when a WLAN or BT module transmission within the user device occurs, the measurement result for the frequency configured via the network is not included in the logged measurement result entry. Rather, a measurement result for frequencies other than the frequency configured via the network is included in the logged measurement result entry and then the entry is reported to the network.

In the above-described embodiments of the present invention, if the logged MDT is configured for the user device, the user device performs logging. In this connection, the logged measurements may include all possible measurements, including E-UTRA measurements and other RAT based measurements.

As described above, depending on whether the user device has capabilities to utilize the IDC indicator, the capabilities of the user device to detect whether (LTE) downlink transmissions are affected by ISM in-device module transmissions may be determined. However, the user device may not know whether inter-RAT measurements are corrupted by in-device module interference. Optional logging based on in-device module interference is only about whether E-UTRA measurements are corrupted. The user device does not consider whether inter-RAT measurements are corrupted or not. Thus, even though the user device knows that inter-RAT measurements are corrupt, the user device may not omit skipping measurement logging.

Figure 21:
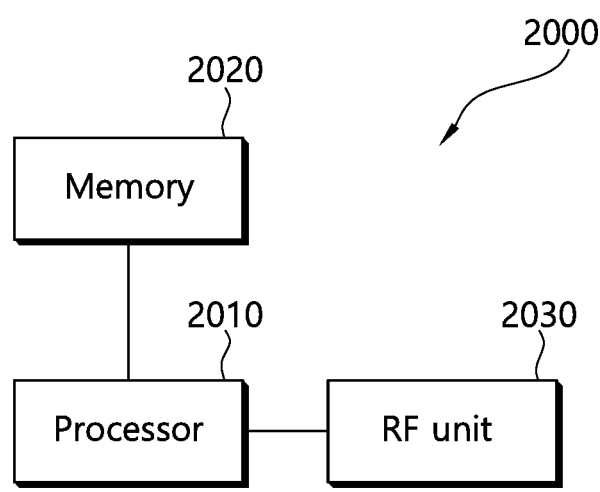
FIG. 21 is a block diagram illustrating the user device in which the present invention is implemented.

FIG. 21 is a block diagram illustrating the user device in which the present invention is implemented.

Referring to FIG. 21, the user device 1100 includes a processor 1110, a memory 1120, and a radio frequency unit 1130. Processor 1110 implements the proposed functionality, process and/or method. For example, processor 1110 may determine whether downlink is affected by interference. If it is determined that the downlink is affected by the interference, processor 1110 may determine whether to perform logging. Thereafter, the processor 1110 may perform logging based on the determination.

The RF unit 1130 is connected to the processor 1110 to transmit and receive radio signals.

The processor may comprise an application-specific integrated circuit (ASIC), other chipset, logic circuitry and/or a data processing device. The memory may include read-only memory (ROM), random access memory (RAM), flash memory, memory card, storage media and/or other storage devices. The RF unit may include a baseband circuit for processing the radio signal. When the embodiment is implemented in software, the above-described techniques may be implemented with modules (processes, functions, etc.) that perform the functions described above. The module may be stored in memory and executed by the processor. The memory may be internal or external to the processor, and may be coupled to the processor by any of a variety of well known means.

What is claimed is:

1. A method for logging a measurement in a wireless communication system, the method performed by a user equipment (UE) and comprising:
   determining whether a downlink is affected by interference;
   determining whether to perform logging of the measurement for the down link based upon a determination that it is unclear whether the downlink is affected by the interference and that a module in the UE is turned on to effect the measurement for the downlink;
   performing the logging of the measurement for the downlink based on the determination that is unclear whether the downlink is affected by the interference and that a module in the UE is turned on to effect the measurement for the downlink; and
   transmitting, to a base station, the logged measurement with potential interference information, wherein the potential interference information informs the base station that the logged measurement is possibly affected by the interference.

2. The method of claim 1 further comprising:
   determining whether to perform logging of the measurement for the downlink based upon a determination that it is unclear whether the downlink is affected by the interference, wherein the determination that is unclear whether the downlink is affect by the interference is based on a determination that the downlink is affected by interference by a value less than or equal to a pre-configured value; and
   performing the logging of the measurement for the downlink based on the determination that the downlink is affected by interference by a value less than or equal to a pre-configured value.

3. The method of claim 1,
   wherein the UE is capable of using an in-device interference (IDC) indicator, and
   wherein the IDC indicator includes information indicating that the UE has experienced IDC interference.

4. The method of claim 1, wherein the downlink is a LTE (Long Term Evolution) downlink.

5. The method of claim 1, wherein the interference is caused by in-device communication.

6. A user equipment (UE) comprising:
   a transceiver configured for transmitting and receiving a radio signal; and
   a processor operatively coupled to the transceiver, wherein the processor is configured to:
   determine whether a downlink is affected by interference;
   determine whether to perform logging of a measurement for the downlink based upon a determination that it is unclear whether the downlink is affected by the interference and that a module in the UE is turned on to effect the measurement for the downlink;
   perform the logging of the measurement for the downlink based on the determination that is unclear whether the downlink is affected by the interference and that a module in the UE is turned on to effect the measurement for the downlink; and
   control the transceiver to transmit, to a base station, the logged measurement with potential interference information, wherein the potential interference information informs the base station that the logged measurement is possibly affected by interference.

7. The UE of claim 6, wherein the processor is further configured to:
   determine whether to perform logging of the measurement for the downlink based upon a determination that it is unclear whether the downlink is affected by the interference, wherein the determination that is unclear whether the downlink is affect by the interference is based on a determination that the downlink is affected by interference by a value less than or equal to a pre-configured value; and
   perform the logging of the measurement for the downlink based on the determination that the downlink is affected by interference by a value less than or equal to a pre-configured value.

* * * * *